United States Patent Office 3,224,861
Patented Dec. 21, 1965

3,224,861
CONTROLLING UNDESIRED VEGETATION WITH BENZYL HEXAMETHYLENIMINE-CARBOTHIOATES
John J. D'Amico, Charleston, W. Va., assignor to Monsanto Company, a corporation of Delaware
No Drawing. Filed July 3, 1961, Ser. No. 121,335
13 Claims. (Cl. 71—2.5)

This invention relates to herbicidal compositions and methods employing as the essential active ingredient a toxic concentration of a benzyl ester of 1-hexamethylene-iminecarbothioic acid.

It is an object of the present invention to provide compositions and methods for destruction or control of undesired vegetation. A particular object is to provide pre-emergence herbicides exerting formative action on broadleaf plants. Other objects will become apparent from the following specification and claims.

A method of destroying or controlling undesired vegetation, according to this invention, comprises applying to the soil surface before emergence of the vegetation to be destroyed a phytotoxic benzyl ester of 1-hexamethylene-iminecarbothioic acid represented by the general formula

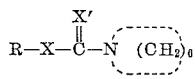

where X and X' represent oxygen or sulfur at least one of which, preferably X, is sulfur and R is preferably benzyl but may be halobenzyl, the number of halogen atoms being less than five. The halogen substituents are preferably chlorine but bromine and to a lesser extent fluorine and iodine are also suitable. Examples of R comprise benzyl, 2,6-dichlorobenzyl, 2,3,6-trichlorobenzyl, 2,6-dibromobenzyl, 2,3,6-tribromobenzyl, 2,3,4-trichlorobenzyl, o-chlorobenzyl, m-chlorobenzyl, p-chlorobenzyl, 2,3-dichlorobenzyl, 2,3,4,5-tetrachlorobenzyl and 2,3,5,6-tetrachlorobenzyl.

The compounds herein designated ar,ar,ar-trichlorobenzyl esters were derived from reaction of an alkali metal thiocarbamate with chlorobenzyl chloride prepared by chlorinating toluene in the ring in the presence of iron until the gain in weight corresponded to that calculated for trichlorotoluene and then removing the iron and chlorinating the side chain until the gain in weight corresponded to that calculated for trichlorobenzyl chloride. It is a mixture of several components and includes several different isomers a substantial proportion of which is 2,3,6-.

The herbicidal compositions of the invention are prepared by admixing the ester with a carrier material of the kind used and referred to in the art as a herbicidal adjuvant in order to provide formulations adapted for ready and efficient application in liquid or solid form. Solid compositions are preferably in the form of granules or dusts and are formulated by mixing the toxicant with a granular or finely divided solid, as for example talc, clay, pyrophyllite, silica and fuller's earth. Liquid compositions are prepared by admixing the active ingredient with a conventional liquid diluent media. The active ingredients are insoluble in water but they are soluble in common organic solvents. They may be dispersed directly in water or dissolved first in an organic solvent and then dispersed. Surfactants aid dispersion and wetting for which purpose there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of any of the following: alkyl phenols, tall oil, higher fatty acids, and higher alkyl mercaptans.

Pre-emergence herbicides are applied to the soil surface before the plants emerge. The toxicants may be applied to the soil conveniently in the form of a spray containing the active ingredients in a concentration within the range of 0.1–10.0% by weight. The amount required for effective control of vegetation will vary but amounts within the range of ¼ to 60 pounds per acre comprise the useful range under most conditions.

As illustrative of the invention, the toxicants were applied as aqueous sprays to germinating seedlings of various plant species. The plant species included morning glory, wild oat, brome grass, rye grass, radish, sugar beets, foxtail, crab grass, pigweed, soybean, wild buckwheat, tomato and sorghum. The active ingredient was emulsified in water and applied to seeded soil at the rates shown in the table. About fourteen days after application of the toxicants results were observed and recorded. The number of seeds emerging was converted to weighted herbicidal ratings based on average percent germination of any particular seed lot times an injury factor. This evened irregularities of herbicide ratings of seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale:

| Percent emergence: | Phytotoxicity rating |
|---|---|
| 0–25 | Severe. |
| 26–50 | Moderate. |
| 51–75 | Slight. |
| 76–100 | None. |

The phytotoxicities are recorded below:

TABLE I

| Active Ingredient | Lbs./acre | Results Observed |
|---|---|---|
| 2,3,6-trichlorobenzyl 1-hexamethyleniminecarbodithioate | 5 | Formative action broadleaf. Severe phytotoxicity to morning glory and pigweed; moderate phytotoxicity to sugar beets, crab grass, soybean and tomato. |
| 2,6-dicholorobenzyl 1-hexamethyleniminecarbodithioate | 5 | Formative action broadleaf. Severe phytotoxicity to crab grass; moderate phytotoxicity to wild oats and tomato. |
| m-Chlorobenzyl 1-hexamethyleniminecarbodithioate | 25 | Formative action broadleaf. Chlorosis grass. Severe phytotoxicity to brome grass, crab grass, pigweed, wild buckwheat and moderate phytotoxicity to wild oats, rye grass and foxtail. |
| ar,ar,ar-Trichlorobenzyl 1-hexamethyleniminecarbodithioate | 5 | Formative action broadleaf. Severe phytotoxicity to morning glory, crab grass, pigweed, soybean and wild buckwheat; moderate phytotoxicity to radish, sugar beets, foxtail and tomato. |
| 2,3,6-trichlorobenzyl 1-hexamethyleniminecarbothiolate | 5 | Formative action broadleaf. Severe phytotoxicity to foxtail, crab grass, pigweed and soybean. |
| 2,6-dichlorobenzyl 1-hexamethyleniminecarbothiolate | 5 | Formative action grass and broadleaf-tillering. Severe phytotoxicity to foxtail, crab grass, pigweed; moderate phytotoxicity to morning glory, wild oats and tomato. |
| ar,ar,ar-Trichlorobenzyl 1-hexamethyleniminecarbothiolate | 5 | Severe phytotoxicity to pigweed and soybean; moderate phytotoxicity to wild oats. |
| Benzyl 1-hexamethyleniminecarbothiolate | 5 | General formative action. Severe phytotoxicity to brome grass, rye grass, sugar beets, foxtail, crab grass, pigweed, wild buckwheat, tomato and sorghum; moderate phytotoxicity to morning glory, wild oats and radish. |
| Benzyl 1-hexamethyleniminecarbothionate | 5 | Severe phytotoxicity to foxtail, crab grass, pigweed and sorghum. |
| Benzyl 1-hexamethyleniminecarbodithioate | 5 | Severe phytotoxicity to rye grass, sugar beets, foxtail, crab grass, pigweed, soybean and sorghum; moderate phytotoxicity to wild oats and wild buckwheat. |
| ar,ar,ar-Trichlorobenzyl 1-hexamethyleniminecarbothionate | 5 | Formative action broadleaf. Severe phytotoxicity to morning glory sugar beets, pigweed, soybean, wild buckwheat and tomato. |
| 2,3,6-trichlorobenzyl 1-hexamethyleniminecarbothionate | 5 | Formative action broadleaf. Severe phytotoxicity to morning glory, sugar beets, pigweed, soybean and tomato; moderate phytotoxicity to radish, crab grass and wild buckwheat. |

Greater efficiency than from surface application results from incorporating the toxicants into the top layer of soil. At a dosage of one pound per acre 2,3,6-trichlorobenzyl 1-hexamethyleniminecarbothionate exerted severe phytotoxicity to morning glory, sugar beets, foxtail, pigweed, soybean, wild buckwheat and tomato and moderate phytotoxicity to crab grass. At a dosage of one pound per acre ar,ar,ar-trichlorobenzyl 1-hexamethyleniminecarbothionate exerted severe phytotoxicity to morning glory, foxtail and crab grass and moderate phytotoxicity to sugar beets, pigweed and soybean.

The importance of six methylene groups in the heterocyclic ring is brought out by comparing total phytotoxicities to corresponding piperidine derivatives. Phytotoxicity ratings were obtained as described, severe phytotoxicity being designated 3, moderate 2, slight 1 and no phytotoxicity by 0. The numerical ratings for each test species were then added. Typical results are recorded below:

TABLE II

| | Lbs./acre | Total phytopoxicity |
|---|---|---|
| Benzyl 1-hexamethyleniminecarbothiolate | 1 | 13 |
| Benzyl 1-hexamethyleniminecarbodithioate | 1 | 4 |
| Benzyl 1-piperidinecarbodithioate | 1 | 0 |
| Benzyl 1-hexamethyleniminecarbothionate | 5 | 13 |
| Benzyl 1-piperidinecarbothionate | 25 | 11 |

Preparation of the toxicants, most of which are new compounds, is illustrated below.

ar,ar,ar-Trichlorobenzyl 1 - hexamethyleniminecarbothiolate was prepared as follows: To a stirred solution of 30.0 grams (0.3 mole) of 1-hexamethylenimine, 50 ml. of water and 40 grams (0.25 mole) of 25% sodium hydroxide was added at 0–7° C. over a 30 minute period 19 grams (0.27 mole) of 85% carbonoxysulfide. There was then added in one portion 46 grams (0.2 mole) of ar,ar,ar-trichlorobenzyl chloride, the mixture maintained for one hour periods at each of the following temperatures: 0–5° C.; 5–10° C.; 10–15° C.; 15–20° C.; 20–25° C. and then for 19 hours at 25–30° C. Thereupon the reaction mixture was extracted with 400 ml. of ethyl ether, the ether solution washed with water until neutral to litmus and dried over sodium sulfate. The ether was removed in vacuo at a maximum temperature of 80–90° C./1–2 mm. The product was obtained in 85% yield as an amber oil.

Substituting 31.6 grams (0.25 mole) of benzyl chloride in the foregoing procedure yielded benzyl 1-hexamethylenimine-carbothiolate in 90.5% yield as an amber liquid analyzing 5.5% nitrogen and 13.5% sulfur compared to 5.6% nitrogen and 12.9% sulfur calculated for $$C_{14}H_{19}NOS$$

To a stirred solution of 10.0 grams (0.1 mole) of 1-hexamethylenimine, 200 ml. of water and 16 grams (0.1 mole) of 25% sodium hydroxide was added dropwise at 5–15° C. 7.6 grams (0.1 mole) of carbon bisulfide and the reaction mixture stirred at 25–30° C. for an hour. There was then added in one portion 23 grams (0.1 mole) of 2,3,6-trichlorobenzyl chloride and the mixture heated at 50–60° C. for 4 hours. After cooling to 5° C., the precipitate was collected by filtration, washed with water until neutral to litmus and air dried at 25–30° C. 2,3,6-trichlorobenzyl 1 - hexamethyleniminecarbodithioate was obtained as a tan solid in 84.3% yield. After recrystallization from alcohol/dimethyl formamide it melted at 138–139° C. Analysis gave 3.7% nitrogen, 17.4% sulfur and 28.7% chlorine compared to 3.8% nitrogen, 17.4% sulfur and 28.8% chlorine calculated for $C_{14}H_{16}Cl_3NS_2$.

In similar manner, 2,5-dimethylbenzyl 1-hexamethylenimine-carbodithioate was obtained as a light tan solid in 99% yield. After recrystallization from ethyl alcohol it melted at 66–67° C. Analysis gave 4.8% nitrogen and 22.2% sulfur compared to 4.8% nitrogen and 21.9% sulfur calculated for $C_{16}H_{23}NS_2$.

To a stirred solution of 30.0 grams (0.3 mole) of 1-hexamethylenimine, 50 ml. of water and 40 grams (0.25 mole) of 25% sodium hydroxide at 0–6° C. was added in 30 minutes 19 grams (0.27 mole) of carbonoxysulfide. There was then added in one portion 57.5 grams (0.25 mole) of 2,3,6-trichlorobenzyl chloride and the reaction mixture stirred at 25–30° C. for 24 hours. Thereupon, 200 ml. of water and 350 ml. of ethyl ether were added, the ether solution separated, washed with water until neutral to litmus and dried over sodium sulfate. The ether was removed in vacuo at a maximum temperature of 80–90° C./1–2 mm. 2,3,6-trichlorobenzyl 1-hexamethyleniminecarbothiolate was obtained as a viscous amber oil in 68.2% yield. Analysis gave 3.6% nitrogen and 9.0% sulfur compared to 4.0% nitrogen and 9.1% sulfur calculated for $C_{14}H_{16}Cl_3NOS$.

Substituting 2,6-dichlorobenzyl chloride in the foregoing procedure yielded 2,6-dichlorobenzyl 1-hexamethyleniminecarbothiolate as an amber liquid analyzing 4.0% nitrogen and 9.7% sulfur compared to 4.4% nitrogen and 10.1% sulfur calculated for $C_{14}H_{17}Cl_2NOS$.

To a stirred slurry comprising 21.2 grams (0.1 mole) of ar,ar,ar-trichlorobenzyl alcohol, 200 ml. of heptane and 10.6 grams (0.1 mole) of sodium carbonate was added in one portion 17.8 grams (0.1 mole) of 1-hexamethyleniminethiocarbonyl chloride. The reaction mixture was heated at refluxing temperature for 18 hours, then filtered hot to remove the impurities. The solvent was removed in vacuo at a maximum temperature of 80–90° C./1–2 mm. ar,ar,ar - trichlorobenzyl 1 - hexamethyleniminecarbothionate was obtained in 99% yield as an amber semi-solid. Analysis gave 3.88% nitrogen compared to 3.97% calculated for $C_{14}H_{16}Cl_3NOS$.

Substituting 21.2 grams (0.1 mole) of 2,3,6-trichlorobenzyl alcohol for the ar,ar,ar-trichlorobenzyl alcohol in the above procedure, the reaction mixture was heated at refluxing temperature for 6 hours. 2,3,6-trichlorobenzyl 1 - hexamethylenimine - carbothionate was obtained in 84.9% yield as an amber semi-solid. Analysis gave 3.87% nitrogen compared to 3.97% calculated for $$C_{14}H_{16}Cl_3NOS$$

The physical properties of certain other phytotoxic esters are set forth below:

York), in place of the expression "emulsifying agent" to connote generically the various "emulsifying agents," "dispersing agents," "wetting agents" and "spreading agents" that are adapted to be admixed with the active compounds of this invention in order to secure better wetting and spreading of the compound in water vehicle or carrier in which it is insoluble through lowering the surface tension of the water (see also Frear, "Chemistry of Insecticides, Fungicides and Herbicides," second edition, page 280). These surfactants include the well-known capillary-active substances which may be anionactive (or anionic), cation active (or cationic), or non-ionizing (or non-ionic), which are described in detail in Volumes I and II of Schwartz, Perry and Berch's "Surface Active Agents and Detergents" (1958, Interscience Publishers, Inc., New York), and also in the November 1947 issue of Chemical Industries (pages 811–824) in an article entitled, "Synthetic Detergents," by John W. McCutcheon and also in the July, August, September and October 1952 issues of Soap and Sanitary Chemicals under the title "Synthetic Detergents." The preferred surfactants are the water-soluble anionic surface-active agents and the water-soluble non-ionic surface-active agents set forth in U.S. 2,846,398 (issued August 5, 1958). In general it is preferred that a mixture of

| Structural formula | Analysis, percent | | M.P., °C. | Yield, percent |
| --- | --- | --- | --- | --- |
| | Calcd. | Found | | |
| 2,6-dichlorobenzyl 1-hexa-methyleniminecarbo-dithioate  | N 4.2<br>S 19.2<br>Cl 21.2 | 4.1<br>19.3<br>21.4 | 112–114 a | 93.0 |
| m-Chlorobenzyl 1-hexa-methyleniminecarbo-dithioate | N 4.7<br>S 21.4<br>Cl 11.8 | 4.8<br>22.0<br>11.5 | 48–50 b | 96.6 |
| ar,ar,ar-Trichlorobenzyl 1-hexamethylenimine-carbodithioate | N 3.8<br>S 17.4 | 3.7<br>17.1 | 75–85 a | 84.0 |
| Benzyl 1-hexamethyleni-minecarbothionate | N 5.6 | 5.1 | Amber liquid | 72.0 | a Recrystallized from ethyl alcohol.
b Recrystallized from heptane.

The term "surfactant" as employed in the specification and in the appended claims is used as in volume II of Schwartz, Perry and Berch's "Surface Active Agents and Detergents" (1958, Interscience Publishers, Inc., New York), water-soluble anionic and water-soluble non-ionic surfactants be employed.

It is intended to cover all changes and modifications of the examples of the invention herein chosen for purposes

What is claimed is:

1. The method of destroying undesired vegetation which comprises applying to the soil before the plants emerge a phytotoxic concentration of an ester of 1-hexamethyleniminecarbothioic acid of the formula

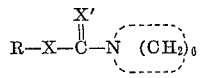

where X and X' are selected from a group consisting of oxygen and sulfur at least one of which is sulfur and R represents a radical selected from the group consisting of benzyl and halobenzyl containing not more than four halogen atoms.

2. The method of destroying undesired vegetation which comprises applying to the soil before the plants emerge a phytotoxic concentration of an ester of 1-hexamethyleniminecarbothioic acid of the formula

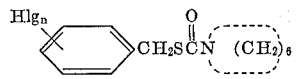

where Hlg represents halogen and $n$ is an integer of 1–4 inclusive.

3. The method of destroying undesired vegetation which comprises applying to the soil before the plants emerge a phytotoxic concentration of an ester of 1-hexamethyleniminecarbothioic acid of the formula

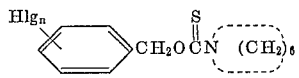

where Hlg represents halogen and $n$ is an integer of 1–4 inclusive.

4. The method of destroying undesired vegetation which comprises applying to the soil before the plants emerge a phytotoxic concentration of an ester of 1-hexamethyleniminecarbothioic acid of the formula

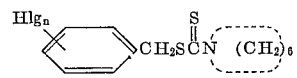

where Hlg represents halogen and $n$ is an integer of 1–4 inclusive.

5. The method of destroying undesired vegetation which comprises applying to the soil before the plants emerge a phytotoxic concentration of benzyl 1-hexamethyleniminecarbothiolate.

6. The method of destroying undesired vegetation which comprises applying to the soil before the plants emerge a phytotoxic concentration of benzyl 1-hexamethyleniminecarbodithioate.

7. The method of destroying undesired vegetation which comprises applying to the soil before the plants emerge a phytotoxic concentration of benzyl 1-hexamethyleniminecarbothionate.

8. The method of destroying undesired vegetation which comprises applying to the soil before the plants emerge a phytotoxic concentration of 2,3,6-trichlorobenzyl 1-hexamethyleniminecarbodithioate.

9. A herbicidal composition comprising a major proportion of inert herbicidal adjuvant as carrier and a minor but herbicidally effective proportion of an ester of 1-hexamethyleniminecarbothioic acid of the formula

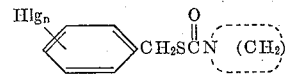

where Hlg represents halogen and $n$ is an integer of 1–4 inclusive, in intimate admixture with a surfactant.

10. A herbicidal composition comprising a major proportion of inert herbicidal adjuvant as carrier and a minor but herbicidally effective proportion of an ester of 1-hexamethyleniminecarbothioic acid of the formula

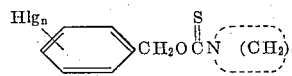

where Hlg represents halogen and $n$ is an integer of 1–4 inclusive, in intimate admixture with a surfactant.

11. A herbicidal composition comprising a major proportion of inert herbicidal adjuvant as carrier and a minor but herbicidally effective proportion of benzyl 1-hexamethyleniminecarbothiolate in intimate admixture with a surfactant.

12. A herbicidal composition comprising a major proportion of inert herbicidal adjuvant as carrier and a minor but herbicidally effective proportion of benzyl 1-hexamethyleniminecarbothionate, in intimate admixture with a surfactant.

13. The method of destroying undesired vegetation which comprises applying to the soil before the plants emerge a phytotoxic amount of dimethylbenzyl 1-hexamethyleniminecarbodithioate.

References Cited by the Examiner

UNITED STATES PATENTS

| | | | |
|---|---|---|---|
| 2,187,719 | 1/1940 | Williams | 260—239 |
| 2,690,440 | 9/1954 | Himel | 260—239 |
| 2,740,778 | 4/1956 | Diamond et al. | 260—239 |
| 2,759,926 | 8/1956 | Reppe et al. | 260—239 |
| 2,786,834 | 3/1957 | Rice et al. | 260—239 |
| 2,881,165 | 4/1959 | Janssen et al. | 260—239 |
| 2,914,392 | 11/1959 | D'Amico | 71—2.5 |
| 2,929,702 | 3/1960 | Speziale | 71—2.5 |
| 2,941,879 | 6/1960 | Goodhue | 71—2.5 X |
| 2,992,091 | 7/1961 | Harman et al. | 71—2.6 |
| 3,078,153 | 2/1963 | Harman et al. | 71—2.5 |

OTHER REFERENCES

Fischer et al., German application, 1,032,023, printed June 12, 1958 (KL 4515), (2 pp. spec., no dwg.).

LEWIS GOTTS, *Primary Examiner.*

MAURICE A. BRINDISI, *Examiner.*